(12) United States Patent
Gaertner et al.

(10) Patent No.: US 8,824,003 B2
(45) Date of Patent: Sep. 2, 2014

(54) PRINT JOB STATUS IDENTIFICATION USING GRAPHICAL OBJECTS

(75) Inventors: Joseph P. Gaertner, Lafayette, CO (US); Joan Stagaman Goddard, Boulder, CO (US); Janeen E. Jahn, Lafayette, CO (US); Kumar V. Kadivala, Boulder, CO (US); Ronald JLeMaster, Boulder, CO (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 192 days.

(21) Appl. No.: 13/015,406

(22) Filed: Jan. 27, 2011

(65) Prior Publication Data

US 2012/0194830 A1    Aug. 2, 2012

(51) Int. Cl.
*G06K 15/02* (2006.01)
*G06F 3/12* (2006.01)

(52) U.S. Cl.
CPC ............ *G06F 3/1288* (2013.01); *G06F 3/1203* (2013.01); *G06F 3/126* (2013.01); *G06F 3/1282* (2013.01); *G06F 3/1217* (2013.01); *G06F 3/1259* (2013.01)
USPC .......................................... 358/1.5; 358/1.15

(58) Field of Classification Search
USPC ........................................................ 358/1.15
See application file for complete search history.

(56) References Cited

U.S. PATENT DOCUMENTS

| 2002/0188707 | A1* | 12/2002 | Terrill ........................... 709/223 |
| 2006/0185534 | A1* | 8/2006 | Kobayashi .................... 101/120 |
| 2011/0013924 | A1* | 1/2011 | Hosoi .............................. 399/83 |
| 2012/0120452 | A1* | 5/2012 | Utsunomiya et al. ........ 358/1.15 |

* cited by examiner

*Primary Examiner* — Qian Yang
(74) *Attorney, Agent, or Firm* — Duft Bornsen & Fettig LLP

(57) ABSTRACT

Methods and systems are provided for visually representing print jobs in a print queue. In one embodiment, a system comprising a print queue, a scheduler, and a Graphical User Interface (GUI) is disclosed. The print queue stores print jobs for a printer. The scheduler estimates a time to print each of the print jobs on the printer. The GUI displays a graphical representation of each of the print jobs in the print queue, where a size of a graphical representation of each of the print jobs is based on the estimated time to print each of the print jobs.

18 Claims, 5 Drawing Sheets

PRINT JOB STATUS IDENTIFICATION USING GRAPHICAL OBJECTS

FIELD OF THE INVENTION

The invention relates to the field of printing systems and, in particular, to displaying the status of queued print jobs using graphical objects.

BACKGROUND

Larger enterprises often employ fairly complex print shop architectures to address their various printing needs. For example, members of an organization may use local printers for simple desktop publishing (e.g., letters, memorandums, pictures, etc.). However, when the organization requires more sophisticated and/or larger volume printing, the organization may employ a print shop architecture comprising a number of higher-end printers (e.g., multifunction printers, production printing systems, etc.) that are able to provide more functionality and/or volume printing capabilities.

These print shop architectures are typically managed by a print server that receives print jobs from a plurality of clients via host system devices (e.g., networked computer systems, mobile devices, etc.). Print jobs are then assigned to print queues associated with specific printers. A print operator may manage a large number of print jobs as they are processed by the print shop. For example, dozens or even hundreds of print jobs may be in a print queue awaiting their turn at a printer. Often, the print operator may want to know the status of the print jobs as they make their way through the print queue. For example, the print operator may want to know when a specific print job in the print queue will be printed, or if some jobs are expected to take longer to print than other jobs in order to handle a specific job differently. A print operator may know that the specific job in the queue has handling requirements that are different than other print jobs in the queue, and therefore, may want more information about when the print job will start printing in order to make preparations. Typically, print jobs in the queue are represented as a list of jobs, which provides little or no information to allow the print operator to identify when a print job may start printing or how long a print job may take to print after it starts.

SUMMARY

Embodiments disclosed herein provide for displaying graphical representations for print jobs in a print queue based on an estimated time to print each of the print jobs. By viewing the graphical representations, a print operator may visually determine information about a specific print job in a print queue such as an estimated time to print the print job, an estimated time for the print job to start printing, and an order in which the print jobs are found in the print queue. Using the information, the print operator may then be able to estimate when a specific print job may start and/or finish printing. This gives the print operator more information about the job for planning purposes.

In one embodiment a system comprising a print queue, a scheduler, and a Graphical User Interface (GUI) is disclosed. The print queue is operable to store print jobs for a printer. The scheduler is operable to estimate a time to print each of the print jobs on the printer. The GUI is operable to display a graphical representation of each of the print jobs in the print queue, where a size of the graphical representation of each of the print jobs is based on the estimated time to print the print jobs.

In another embodiment, a method of graphically representing print jobs in print queues is disclosed. According to the method, print jobs are stored in a print queue for a printer. A time is estimated to print each of the print jobs in the print queue, where a size of the graphical representation of each of the print jobs is based on the estimated time to print each of the print jobs.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
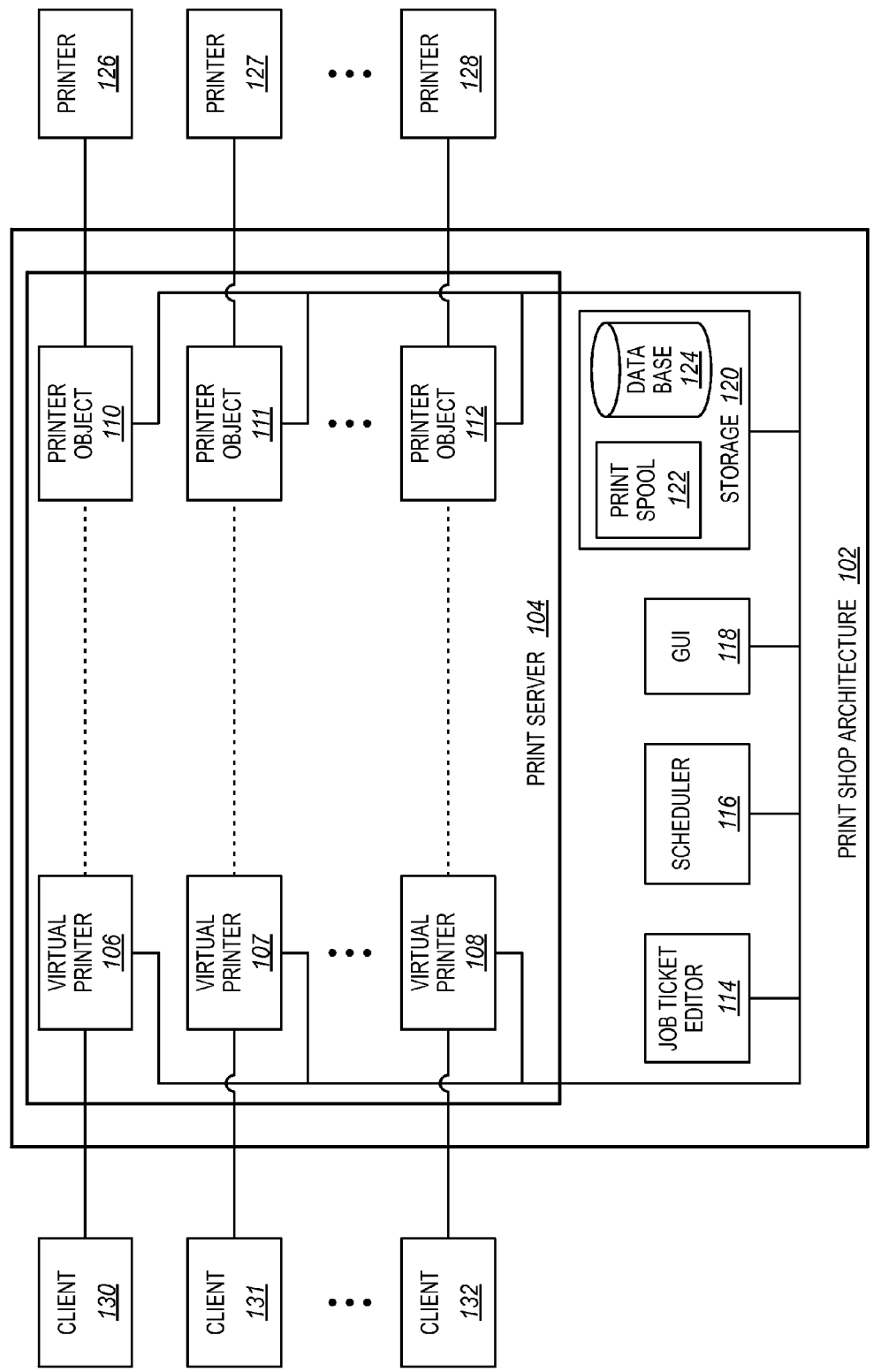
FIG. 1 is a block diagram illustrating a print shop architecture in an exemplary embodiment.

FIG. 1 is a block diagram illustrating a print shop architecture 102 in an exemplary embodiment. Architecture 102 couples one or more clients 130-132 to one or more printers 126-128 to provide printing and print workflow services to clients 130-132. Architecture 102 is operable to receive print jobs and job tickets from clients 130-132 for printing on printers 126-128. Clients 130-132 may include banks, credit card companies, or other entities with printing needs (e.g., monthly bank statements, monthly credit card bills, etc.). Architecture 102 may receive print jobs from clients 130-132 in a number of different formats, such as Portable Document Format (PDF), Mixed Object: Document Content Architecture (MO:DCA), etc. Job tickets may be received from clients 130-132 in a number of different formats, such as Job Definition Format (JDF), Print Production Format (PPF), Portable Job Ticket Format (PJTF), etc. Printers 126-128 generally include systems for transforming print data onto a suitable printable medium, such as paper, and generally are large production printing systems for high volume printing.

Architecture 102 includes a print server 104 having one or more virtual printers 106-108. Virtual printers 106-108 communicate with clients 130-132 and provide an interface similar to a printer driver to allow clients 130-132 to set up print jobs and send print jobs (and a job ticket associated with the print job) to architecture 102. When clients 130-132 send print jobs and job tickets to architecture 102, the job tickets are scanned into a database 124 located in storage 120 of architecture 102. The print jobs and job tickets are then stored in a print spool 122 of storage 120 as open jobs prior to queuing the print jobs for printing. A scheduler 116 identifies the open jobs located in print spool 122 and attempts to schedule the jobs at a queue of one or more printer objects 110-112. Typically, scheduler 116 attempts to schedule the open jobs at one of printer objects 110-112 corresponding with virtual printers 106-108 that received the print job. For example, if client 130 transmitted the print job to virtual printer 106, then scheduler 116 may first attempt to place the print job at a print queue of printer object 110. Generally, printer objects 110-112 interface with corresponding printers 126-128 to queue and to process print jobs prior to transmitting the jobs to printers 126-128.

A print operator may use a Graphical User Interface (GUI) 118 of architecture 102 to control and identify the status of jobs at architecture 102. For example, GUI 118 may provide a list of print jobs in queues of printer objects 110-112 and other general information about the status of open jobs in print spool 122.

The print operator may also use a job ticket editor 114 to modify job tickets associated with both open and queued print jobs. Using job ticket editor 114, the print operator may modify job tickets to change various print options for a print job associated with a job ticket, such as duplexing, stapling, media type, etc. Architecture 102 provides a number of printing and workflow services to clients 130-132 which will become more readily apparent through the following discussion and related figures.

Figure 2:
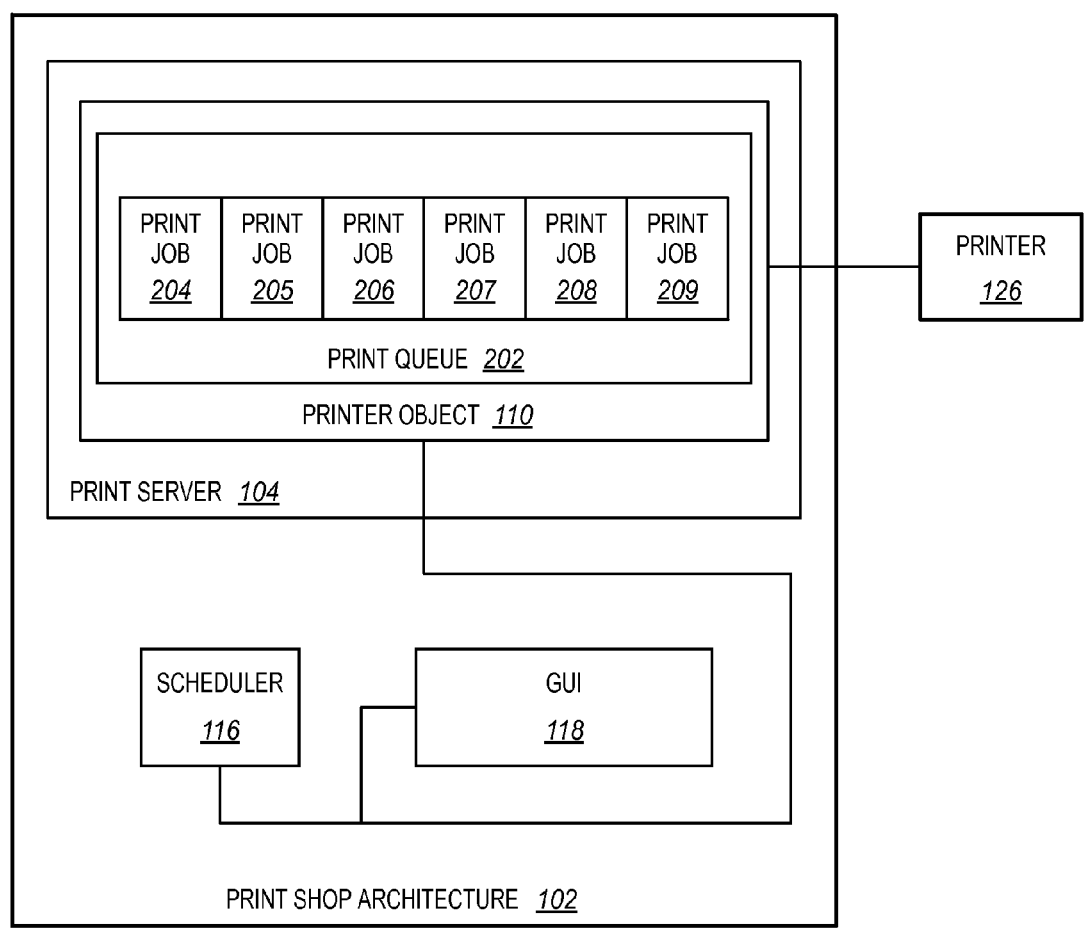
FIG. 2 is a block diagram illustrating additional details for the architecture of FIG. 1 in an exemplary embodiment.

FIG. 2 is a block diagram illustrating additional details for architecture 102 of FIG. 1 in an exemplary embodiment. In like manner to FIG. 1, architecture 102 of FIG. 2 includes print server 104, GUI 118, and scheduler 116. Print server 104 includes printer object 110. Printer object 110 comprises any component, system, or device operable to store print jobs in a print queue 202.

Scheduler 116 comprises any component, system, or device operable to estimate a time to print each of print jobs stored in print queue 202 on a printer. For example, scheduler 116 may estimate a time for to print job 205 on printer 126.

GUI 118 of architecture 102 comprises any component, system, or device operable to display a graphical representation of each of the print jobs stored in print queue 202, where a size of the graphical representation of each of the print jobs is based on the estimated time to print each of the print jobs. For example, GUI 118 may display a graphical box for print job 205 based on the estimated time for printing print job 205 on printer 126. How architecture 102 operates will be discussed in more detail with respect to FIG. 3.

Figure 3:
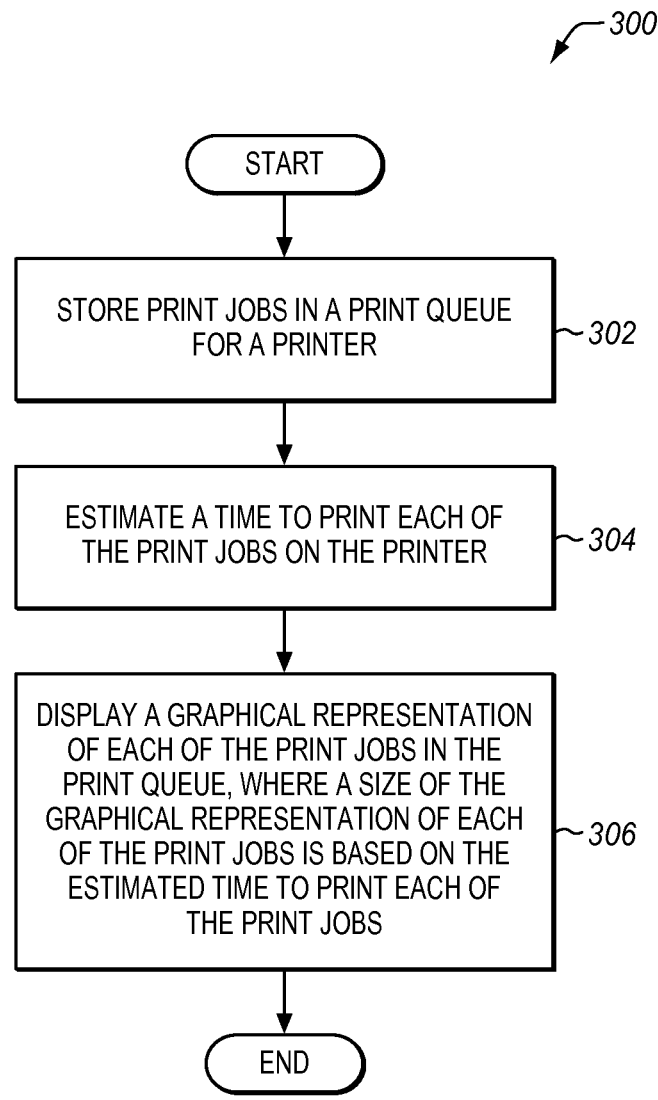
FIG. 3 is a flow chart illustrating a method of graphically representing print jobs in print queues in an exemplary embodiment.

FIG. 3 is a flow chart illustrating a method 300 of graphically representing print jobs in print queues in an exemplary embodiment. The steps of method 300 will be described with respect to architecture 102 of FIG. 2, although one skilled in the art will understand that method 300 may be performed by other systems not shown. The steps of method 300 described herein are not all inclusive and may include other steps not shown. The steps may also be performed in an alternative order.

In step 302, scheduler 116 stores print jobs 204-209 in print queue 202. In step 304, scheduler 116 estimates a time to print each of print jobs 204-209 on printer 126. In some cases, scheduler 116 may use job ticket information stored in database 124 to determine a number of pages for each of print jobs 204-209, and identify a print speed for printer 126. Using the number of pages and the print speed, scheduler 116 may then estimate a time to print each of print jobs 204-209 on printer 126. In other cases, scheduler 116 may use an estimated print speed for printer 126 entered by a print operator. Often, a rated print speed of a printer does not necessarily correspond to an actual print speed of a printer during normal day-to-day operation. For example, downtime for a printer may occur when paper is loaded or a colorant is added to the printer. The downtime, over the day, generates a difference between the rated speed of a printer and the actual speed of the printer. Therefore, the use of an estimated print speed for printer 126 may be more accurate than the use of the rated speed of printer 126. This may allow scheduler 116 to more accurately estimate a time to print each of print jobs 204-209. Other means of estimating a time to print each of print jobs 204-209 may also include determining how complex print jobs 204-209 are for printing. When a print job is complex, then printing the job may take longer normal due to the processing overhead performed on the print job during the printing process at printer 126.

Figure 4:
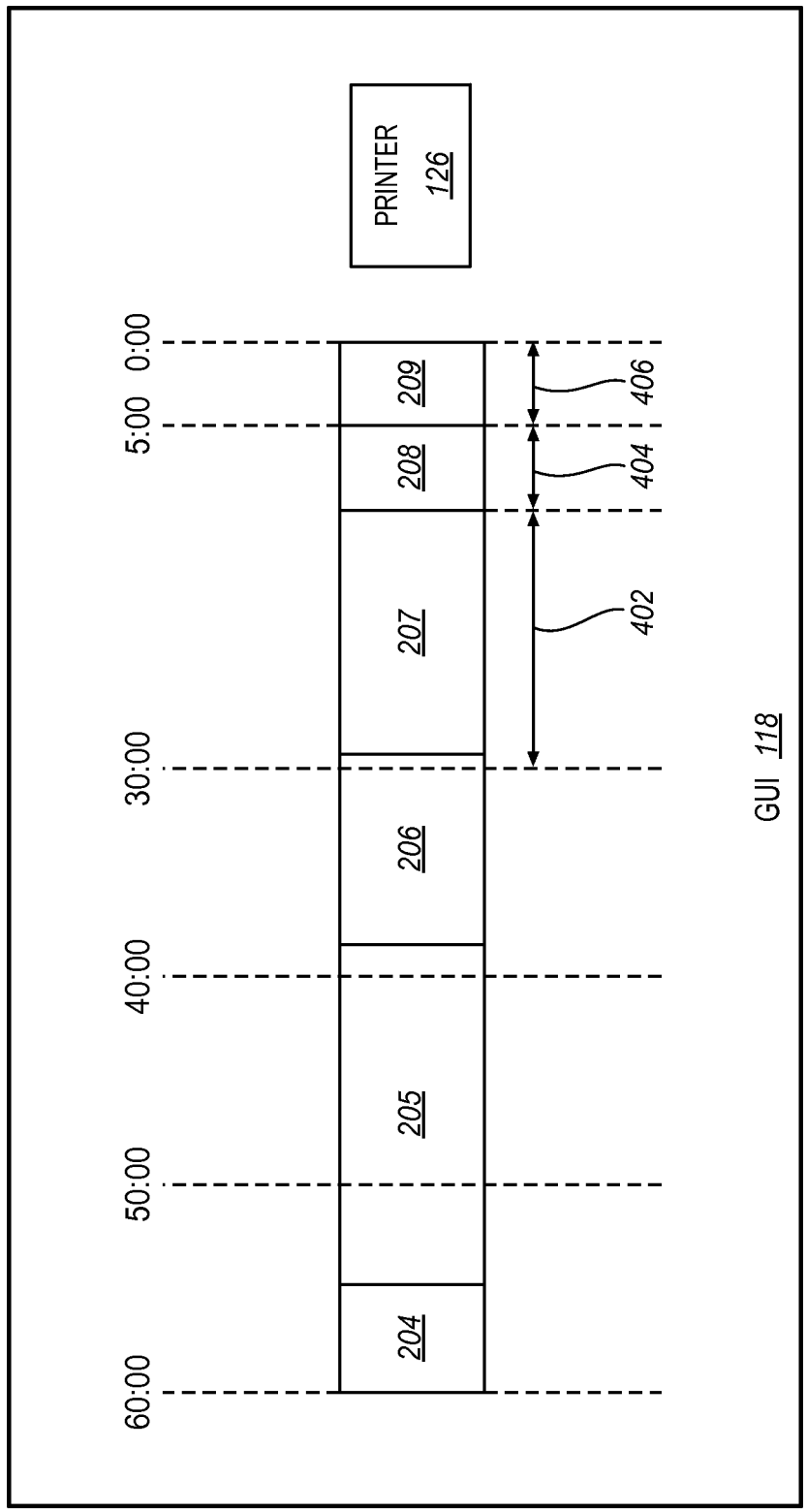
FIG. 4 is a block diagram illustrating how a graphical representation of print jobs in a print queue may be displayed to a print operator in an exemplary embodiment.

In step 306, GUI 118 displays graphical representations of each of print jobs 204-209 in print queue 202, where a size of the graphical representation of each of print jobs 204-209 are based on the estimated time to print calculated in step 304. FIG. 4 is a block diagram illustrating how graphical representations of print jobs 204-209 in a print queue may be displayed to a print operator in an exemplary embodiment. Although the graphical representations shown for print jobs 204-209 are illustrated as boxes in FIG. 4, the graphical representations may also include any type of icon, display element, or other type of visual representation. In FIG. 4, each of print jobs 204-209 are shown in a linear order, with print job 209 shown at time zero (0:00) corresponding with the front of print queue 202, and print job 204 shown at approximately sixty minutes (60:00) corresponding with the back of print queue 202. Each of the vertical dashed time lines in FIG. 4 represents a time estimate for a portion of print queue 202 based on times for printing jobs. For example, print job 206 is estimated by scheduler 116 to begin printing in about thirty minutes, and is estimated to take about ten minutes to print (print job 206 lies between the thirty minute mark and the forty minute mark).

Using the information shown in GUI 118, a print operator may visually determine a status for one or more of print jobs 204-209. For example, the print operator may determine that print job 208 will likely start printing in about five minutes. The print operator may also easily determine that print job 208 will print before print job 204, as print job 208 is near the five minute mark and print job 204 is near the sixty minute mark.

GUI 118 may also scale a width of the graphical representations of print jobs 204-209 based on an estimated time to print each of print jobs 204-209. For example, a width 402 corresponding to print job 207 is wider than width 404 corresponding with print job 208. This information allows the print operator to determine that print job 207 will take longer to print than print job 208. Other methods may be used to indicate an estimated duration of time to print a job, such as a height of the graphical object, a color, a relative size, etc.

When printing a print job, GUI 118 may scale a width 406 as shown for print job 209 based on the progress in printing print job 209. For example, when about half of the pages for print job 209 have been printed, width 406 may be about half of what it was when print job 209 started printing. Also, while print job 209 is printing, scheduler 116 may determine an actual print speed for printer 126 during the printing process. In cases where some portions of print job 209 are more complex than other portions, the printing speed may vary. By determining an actual print speed, GUI 118 may scale width 406 dynamically based on the actual print speed. For example, width 406 may vary to be slightly wider or slightly narrower during the printing process. This provides more accurate information to the print operator for estimating a completion time when printing print job 406.

Figure 5:
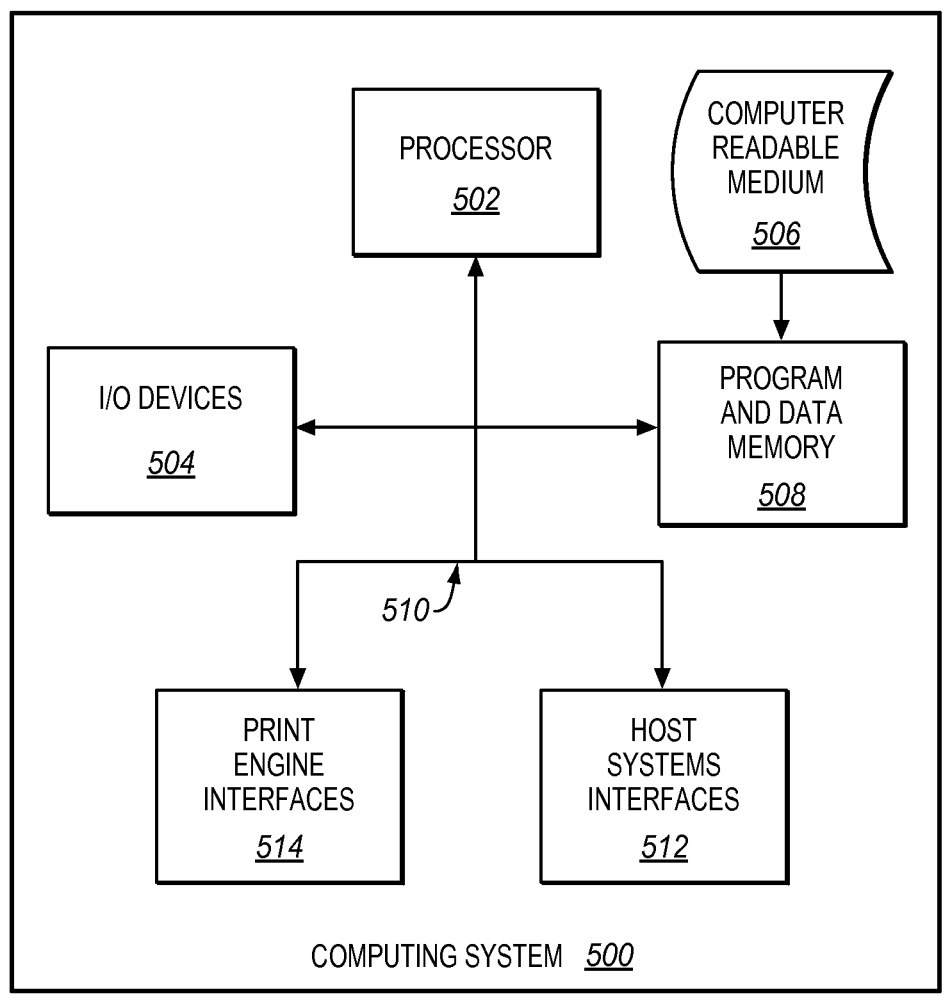
FIG. 5 illustrates a computer system operable to execute computer readable medium embodying programmed instructions to perform desired functions in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 5 illustrates a computing system 500 in which a computer readable medium 506 may provide instructions for performing method 300 in an exemplary embodiment.

Furthermore, the invention can take the form of a computer program product accessible from a computer-usable or computer-readable medium 506 providing program code for use by or in connection with a computer or any instruction execution system. For the purposes of this description, a computer-usable or computer readable medium 506 can be any apparatus that can contain, store, communicate, propagate, or transport the program for use by or in connection with the instruction execution system, apparatus, or device.

The medium 506 can be an electronic, magnetic, optical, electromagnetic, infrared, or semiconductor system (or apparatus or device) or a propagation medium. Examples of a computer-readable medium 506 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution.

Input/output or I/O devices 504 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 512, or remote printers or storage devices through intervening private or public networks, such as through print engine interfaces 514. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. A print server comprising:
a print queue operable to store print jobs for a printer;
a scheduler operable to estimate a time to print each of the print jobs on the printer; and
Graphical User Interface (GUI) operable to display a graphical object for each of the print jobs in the print queue, wherein a size of the graphical object for each of the print jobs is based on the estimated time to print each of the print jobs;
the scheduler is further operable to determine an actual print speed while printing a print job from the print queue;
the GUI is further operable to dynamically scale the size of the graphical object for the print job based on the actual print speed of the print job.

2. The print server of claim 1 wherein:
the GUI is further operable to scale a width of the graphical object for each of the print jobs based on the estimated time to print each of the print jobs.

3. The print server of claim 1 wherein:
the GUI is further operable to display estimated start times for the print jobs based on the estimated time to print each of the print jobs.

4. The print server of claim 1 wherein:
the scheduler is further operable to estimate the time to print each of the print jobs based on a number of pages in each of the print jobs and a rated print speed of the printer.

5. The print server of claim 1 wherein:
the scheduler is further operable to estimate the time to print each of the print jobs based on a number of pages in each of the print jobs and an input from a print operator defining an estimated print speed of the printer.

6. The print server of claim 1 wherein:
the scheduler is further operable to estimate an amount of time to print the print job based on a complexity for printing the print job.

7. A method comprising:
storing print jobs in a print queue for a printer;
estimating a time to print each of the print jobs on the printer; and
display a graphical object for each of the print jobs in the print queue, wherein a size of the graphical object for each of the print jobs is based on the estimated time to print each of the print jobs;
determining an actual print speed while printing a print job;
dynamically scaling the size of the graphical object for the print job based on the actual print speed of the print job.

8. The method of claim 7 wherein:
displaying the graphical object of each of the print jobs further comprises:
scaling a width of the graphical object for each of the print jobs based on the estimated time to print each of the print jobs.

9. The method of claim 7 further comprising:
displaying estimated start times for the print jobs based on the estimated time to print each of the print jobs.

10. The method of claim 7 wherein:
estimating the time to print each of the print jobs is based on a number of pages in each of the print jobs and a rated print speed of the printer.

11. The method of claim 7 wherein:
estimating the time to print each of the print jobs is based on a number of pages in each of the print jobs and input from a print operator defining an estimated print speed of the printer.

12. The method of claim 7 wherein:
estimating the time to print each of the print jobs is based on a complexity for printing each of the print jobs.

13. A non-transitory computer readable medium tangibly embodying programmed instructions which, when executed by a processor, are operable for performing a method of graphically representing print jobs in print queues, the method comprising:

storing print jobs in a print queue for a printer;

estimating a time to print each of the print jobs on the printer;

display a graphical object for each of the print jobs in the print queue, wherein a size of the graphical object for each of the print jobs is based on the estimated time to print each of the print jobs;

determining an actual print speed while printing a print job; and dynamically scaling the size of the graphical object for the print job based on the actual print speed of the print job.

14. The non-transitory computer readable medium of claim 13 wherein:

displaying the graphical object of each of the print jobs further comprises:

scaling a width of the graphical object of each of the print jobs based on the estimated time to print each of the print jobs.

15. The non-transitory computer readable medium of claim 13 wherein the method further comprises:

displaying estimated start times for the print jobs based on the estimated time to print each of the print jobs.

16. The non-transitory computer readable medium of claim 13 wherein:

estimating the time to print each of the print jobs is based on a number of pages in each of the print jobs and a rated print speed of the printer.

17. The non-transitory computer readable medium of claim 13 wherein:

estimating the time to print each of the print jobs is based on a number of pages in each of the print jobs and input from a print operator defining an estimated print speed of the printer.

18. The non-transitory computer readable medium of claim 13 wherein:

estimating the time to print each of the print jobs is based on a complexity for printing each of the print jobs.

\* \* \* \* \*